Figure 1:
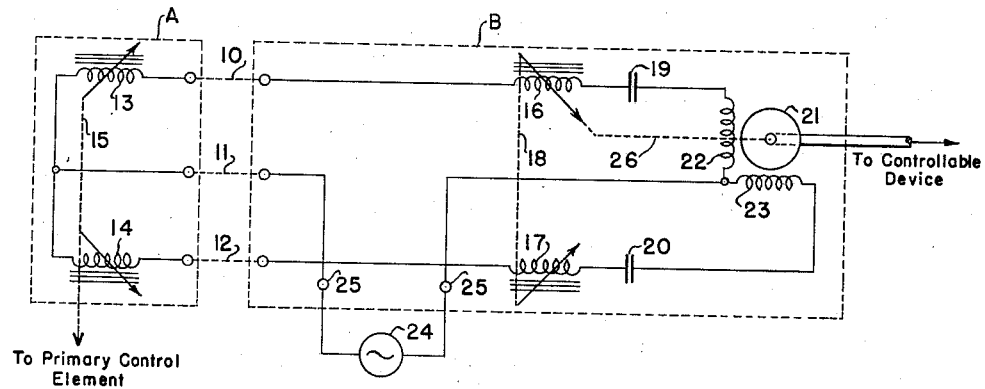

Dec. 4, 1945. H. C. ROTERS 2,390,463
ELECTRICAL CONTROL SYSTEM
Filed Jan. 13, 1944

INVENTOR
HERBERT C. ROTERS
BY
ATTORNEY

Patented Dec. 4, 1945

2,390,463

UNITED STATES PATENT OFFICE 2,390,463

ELECTRICAL CONTROL SYSTEM

Herbert C. Roters, Roslyn, N. Y., assignor to Fairchild Aviation Corporation, a corporation of New York Application January 13, 1944, Serial No. 518,060

6 Claims. (Cl. 172—239)

This invention relates to electrical control systems and is particularly adapted for use in such systems of the type suitable for controlling a secondary controllable device in response to variations in a primary control condition at a control station which, in turn, may be represented by the position or other characteristic of a primary control member. The invention is of general application to remote control systems, follow-up systems, telemetering systems, and any system for the transmission of a control effect or indication in response to variations in a condition of a primary controlling or indicating element. The control station and the secondary controllable device may be a part of the same control unit or they may be located at stations relatively remote from each other.

In United States Letters Patent No. 2,260,122, granted October 21, 1941, upon the application of David W. Moore, Jr., entitled "Electrical control system" and assigned to the same assignee as the present application, there is described and claimed an electrical control system adapted to control a secondary controllable device comprising a control station including a primary adjustable reactance means, either inductive or capacitive or both, and a controlled station, either as a part of the same unit as the control station or remote therefrom. The controlled station includes a secondary adjustable reactance means preferably similar to the primary reactance means and connected to the control station by way of a control-signal translating path. The system also includes additional reactance means, for example a fixed capacitor, connected in circuit with the adjustable reactance means to resonate therewith and a normally balanced polyphase phase-responsive device at the controlled station connected to be energized from suitable supply terminals and unbalanced in response to departures from resonance of the adjustable reactance means, due to variations in the electrical condition of the apparatus at the control station, for adjusting the reactance means to restore its balance and for actuating the secondary controllable device. The present invention comprises an improvement on the system of the above Moore patent having the additional advantages of lower power factor and increased sensitivity, substantial independence from variations in the frequency of the power-supply circuit, and elimination of torque reactions at the control and controlled stations.

It is an object of the present invention, therefore, to provide a new and improved electrical control system of the general type disclosed in the above Moore patent having one or more of the advantageous characteristics enumerated above.

In accordance with the invention, an electrical control system adapted to control a secondary controllable device comprises a control station including a pair of primary adjustable reactors connected to be adjusted in opposite senses in accordance with variations in a primary control condition. The system also comprises a controlled station including a pair of secondary adjustable reactors, a control-signal translating path between the two stations, and periodic current supply terminals for the system. The system also includes a pair of capacitors, each of the primary reactors being individually connected in circuit with one of the secondary reactors and one of the capacitors to form a pair of resonant circuits. A normally balanced polyphase phase-responsive device is located at the controlled station and connected to be energized from the supply terminals and unbalanced in response to departures from resonance of the resonant circuits, due to adjustments of the primary reactors, for adjusting the secondary reactors in opposite senses to restore its balance and for actuating the secondary controllable device.

For a better understanding of the invention, together with other and further objects thereof, reference is had to the following description taken in connection with the accompanying drawing, and its scope will be pointed out in the appended claims.

Figure 2:
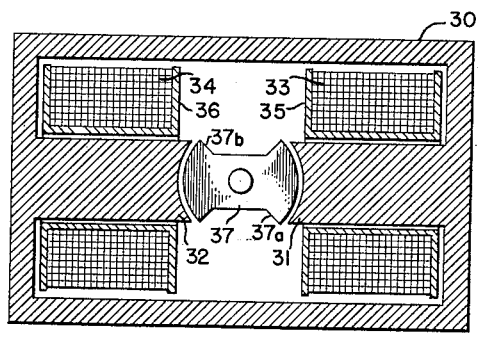

In the drawing, Fig. 1 is a schematic circuit diagram of an electrical control system embodying the invention; while Fig. 2 is a cross-sectional view, partially schematic, of a form of reactor structure particularly suitable for use in the system of Fig. 1.

Referring now to Fig. 1 of the drawing, there is represented an application of the invention to a follow-up system comprising a control station A and a controlled station B interconnected over a control-signal translating path comprising the conductors 10, 11, and 12, the central conductor 11 of which may be a ground circuit. The control station A comprises a pair of primary adjustable reactors 13 and 14, the adjustable elements of which are mechanically interconnected, as indicated by the broken-line link 15, for adjustment in opposite senses in accordance with variations in a primary control condition, such as the position of a primary control element connected to the link 15.

The controlled station B includes a pair of secondary adjustable reactors 16 and 17 also mechanically interconnected by a link 18 for adjustment in opposite senses. The controlled station B also includes a pair of capacitors 19 and 20 and a polyphase phase-responsive device, such as a two-phase motor 21, provided with quadrature phase windings 22 and 23. A source 24 of periodic or alternating current is connected to power-supply terminals 25, 25 included in series in the conductor 11 of the control-signal translating path. As thus arranged, the system comprises a pair of series-resonant circuits, one consisting of the reactor 13, conductor 10, reactor 16, capacitor 19, phase winding 22, supply terminals 25, and conductor 11 and the other consisting of the reactor 14, conductor 12, reactor 17, capacitor 20, phase winding 23, supply terminals 25, and conductor 11. It will be seen that these two resonant circuits form a balanced system with the conductor 11 and the supply terminals 25 in the common branch and each of the two phase windings of the motor 21 energized from the supply terminals 25 in series with one of the resonant circuits. The motor 21 is connected to actuate the secondary controllable device, as indicated, and is also connected by a mechanical link 26 to adjust the secondary reactors 16 and 17 in opposite senses to each other and in opposite senses to the adjustments of their corresponding primary reactors 13 and 14, respectively.

In considering the operation of the electrical control system of Fig. 1, it will be assumed that normally the two resonant circuits including the primary adjustable reactors 13 and 14 and the secondary adjustable reactors 16 and 17 are tuned to resonance by the capacitors 19 and 20, respectively, at the frequency of the alternating current supplied to the terminals 25. Under these conditions the currents in the two resonant circuits are in phase with the alternating potential applied to terminals 25 and the currents in the windings 22 and 23 of the motor 21 are substantially in phase with each other so that the motor 21 is normally balanced. If now the primary adjustable reactors 13 and 14 are adjusted in opposite senses in accordance with variations in a primary control condition, for example, manually adjusted in accordance with a change in position of the primary control element, the two resonant circuits just described are detuned from resonance in opposite senses and the phases of the currents through the windings 22 and 23 are also shifted in opposite senses so that the normally balanced motor 21 becomes unbalanced in response to the departures from resonance of the resonance circuits due to adjustments of the primary reactors. The motor 21 thus develops a torque on its shaft which rotates to adjust the position of the secondary controllable device. At the same time the secondary adjustable reactors 16 and 17 are adjusted in opposite senses through the mechanical link 26, the reactor 16 being adjusted in an opposite sense to the initial adjustment of its associated primary reactor 13 and the secondary reactor 17 being adjusted in opposite sense to that of its associated primary reactor 14. This adjustment continues until the condition of resonance in the two circuits is re-established and the balance of the motor 21 is again restored.

By making the reactors 13, 14, 16, and 17 of the same type, preferably identical, and designing them with the same laws of reactance variation, the position of the shaft of the motor 21 can be made to follow very closely that of the primary control element at the control station A to provide an accurate follow-up system.

In Fig. 2 there is represented an adjustable reactor of a construction particularly suitable for embodiment in the system of Fig. 1. This reactor comprises a closed magnetic yoke 30 with inwardly projecting poles 31 and 32, preferably formed of a stack of punched laminations. Surrounding the poles 31 and 32 are a pair of windings 33 and 34, respectively, disposed in suitable insulated forms or spools 35 and 36, respectively.

The poles 31 and 32 are formed with arcuate pole faces between which is mounted a rotatable core or armature 37 comprising an elongated member with enlarged polepieces 37a and 37b having arcuate pole faces complementary to and closely registering with the arcuate faces of the poles 31 and 32. In embodying the reactor structure of Fig. 2 in the system of Fig. 1, the windings 33 and 34 are connected in series to form a single reactor unit, while the pivoted armatures 37 of the reactors 13 and 14 and of the reactors 16 and 17 are mechanically interconnected to be rotated in opposite directions by the primary control element or by the motor 21 as the case may be.

The electrical control system of Fig. 1 embodying the reactors of the type of Fig. 2 has a number of distinct advantages. For a given volume or weight of the reactors, the overall power factor of the resonant circuits can be made a minimum, resulting in a high degree of sensitivity, that is, a high torque output from the motor 21 per unit deviation between the adjustable elements of the receiver and transmitter reactors. Furthermore, the system is substantially unresponsive to variations in frequency of the source 24, since any such variation produces similar shifts in phase in the currents in the two resonant circuits. Such a variation in frequency primarily affects the sensitivity of the system. In addition, by the mechanical interconnection of the reactors at the control station and at the controlled station for adjustment in opposite senses with opposing mechanical reactions, the torque reaction of the reactors at each station is eliminated. This permits operation from a very low torque input and obtains a high degree of apparent torque amplification from the control station input to the controlled station output, preventing pre-loading of the motor 21 and thus further enhancing the sensitivity of the system. Furthermore, in applications requiring a substantial torque output, the system permits the use of a split-field motor in a balanced circuit energized through suitable gaseous or high vacuum amplifier tubes.

While in the system illustrated, the capacitors 19 and 20, the source 24, and supply terminals 25, 25 are shown as being located at the controlled station, it will be apparent that they may be located at either the control station or the controlled station, or therebetween in the control-signal translating path. It will also be apparent that the control station and the controlled station may be combined into a single unit, in which case the system operates as a torque amplifier, or that they may be remote from each other to operate as a follow-up system or a torque amplifier, or both. It will also be apparent that while the primary and secondary adjustable reactors are described as being connected in series-resonant circuits, they may also be arranged in parallel or series-parallel circuits or in any such arrangement that adjustment of the primary and secondary reactors in each circuit in opposite senses tends to return the circuit to resonance at a given frequency.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical control system adapted to control a secondary controllable device comprising, a control station including a pair of primary adjustable reactors connected to be adjusted in opposite senses in accordance with variations in a primary control condition, a controlled station including a pair of secondary adjustable reactors, a control-signal translating path between said stations, periodic current supply terminals for said system, a pair of capacitors, each of said primary reactors being individually connected in circuit with one of said secondary reactors and one of said capacitors to form a pair of resonant circuits, and a normally balanced polyphase phase-responsive device at said controlled station connected to be energized from said supply terminals and unbalanced in response to departures from resonance of said resonant circuits, due to adjustments of said primary reactors, for adjusting said secondary reactors in opposite senses to restore its balance and for actuating said secondary controllable device.

2. An electrical control system adapted to control a secondary controllable device comprising, a control station including a pair of primary adjustable reactors connected to be adjusted in opposite senses in accordance with variations in a primary control condition, a controlled station including a pair of secondary adjustable reactors, a control-signal translating path between said stations, periodic current supply terminals for said system, a pair of capacitors, each of said primary reactors being individually connected in circuit with one of said secondary reactors and one of said capacitors to form a pair of series-resonant circuits, and a normally balanced polyphase phase-responsive device at said controlled station connected to be energized from said supply terminals and unbalanced in response to departures from resonance of said resonant circuits, due to adjustments of said primary reactors, for adjusting said secondary reactors in opposite senses to restore its balance and for actuating said secondary controllable device.

3. An electrical control system adapted to control a secondary controllable device comprising, a control station including a pair of primary adjustable reactors mechanically interconnected to be adjusted in opposite senses and with opposing mechanical reactions in accordance with variations in a primary control condition, a controlled station including a pair of secondary adjustable reactors mechanically interconnected to be adjusted in opposite senses with opposing mechanical reactions, a control-signal translating path between said stations, periodic current supply terminals for said system, a pair of capacitors, each of said primary reactors being individually connected in circuit with one of said secondary reactors and one of said capacitors to form a pair of resonant circuits, and a normally balanced polyphase phase-responsive device at said controlled station connected to be energized from said supply terminals and unbalanced in response to departures from resonance of said resonant circuits, due to adjustments of said primary reactors, for adjusting said secondary reactors to restore its balance and for actuating said secondary controllable device.

4. An electrical control system adapted to control a secondary controllable device comprising, a control station including a pair of primary adjustable reactors including rotatable adjustable elements mechanically interconnected to adjust their respective reactors in opposite senses with opposing reaction torques in accordance with variations in a primary control condition, a controlled station including a pair of secondary adjustable reactors including rotatable adjustable elements mechanically interconnected to adjust their respective reactors in opposite senses with opposing reaction torques, a control-signal translating path between said stations, periodic current supply terminals for said system, a pair of capacitors, each of said primary reactors being individually connected in circuit with one of said secondary reactors and one of said capacitors to form a pair of resonant circuits, and a normally balanced polyphase phase-responsive device at said controlled station connected to be energized from said supply terminals and unbalanced in response to departures from resonance of said resonant circuits, due to adjustments of said primary reactors, for adjusting said secondary reactors to restore its balance and for actuating said secondary controllable device.

5. An electrical control system adapted to control a secondary controllable device comprising, a control station including a pair of primary adjustable reactors connected to be adjusted in opposite senses in accordance with variations in a primary control condition, a controlled station including a pair of secondary adjustable reactors, a control-signal translating path between said stations, periodic current supply terminals for said system, a pair of capacitors, each of said primary reactors being individually connected in circuit with one of said secondary reactors and one of said capacitors to form a pair of resonant circuits, and a normally balanced two-phase motor at said controlled station and having a pair of phase windings each connected to be energized from said supply terminals in circuit with one of said resonant circuits, said motor being unbalanced in response to departure from resonance of said resonant circuits, due to adjustments of said primary reactors, and connected to adjust said secondary reactors in opposite senses to restore its balance and for actuating said secondary controllable device.

6. An electrical control system adapted to control a secondary controllable device comprising, a control station including a pair of primary adjustable reactors connected to be adjusted in opposite senses in accordance with variations in a primary control condition, a controlled station including a pair of secondary adjustable reactors, a control-signal translating path between said stations, a pair of capacitors, each of said primary reactors being individually connected in circuit with one of said secondary reactors and one of said capacitors to form a balanced pair of resonant circuits having a common branch, periodic current supply terminals included in said common branch, and a normally balanced two-phase motor at said controlled station and having a pair of phase windings each connected in circuit with one of said resonant circuits, said motor being unbalanced in response to departures from resonance of said resonant circuits, due to adjustments of said primary reactors, and connected to adjust said secondary reactors in opposite senses to restore its balance and for actuating said secondary controllable device.

HERBERT C. ROTERS.